United States Patent Office 3,281,429
Patented Oct. 25, 1966

3,281,429
TETRAHYDROPHTHALIC ACID DERIVATIVES
John Edward Franz, Crestwood, Mo., assignor to Monsanto Company, St. Louis, Mo., a corporation of Delaware
No Drawing. Filed May 13, 1965, Ser. No. 455,619
14 Claims. (Cl. 260—326.3)

This invention relates to novel chemical compounds. More particularly, the invention relates to novel ozonolysis products of tetrahydrophthalic acid derivatives, and to a method of preparing such compounds. Specifically the invention relates to novel ozonolysis products of tetrahydrophthalic acid derivatives selected from the group consisting of those having the formulae:

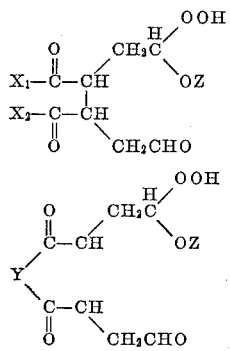

and wherein:

$X_1$ and $X_2$ are each selected from the group consisting of hydroxyl, NHR and OR;
Y is a member of the group consisting of oxygen and NR;
R is a member of the group consisting of alkyl, cycloalkyl, aryl and aralkyl having 1 to 10 carbon atoms.
Z is alkyl having from 1 to 8 carbon atoms, formyl, acetyl, propionyl, butyryl, pentanoyl, hexanoyl, heptanoyl, octanoyl nad benzoyl.

This invention is particularly concerned with a new class of compounds having utility as intermediates in organic synthesis, as in the preparation of 1,2,3,4-butane tetracarboxylic acid derivatives.

It is a primary object of this invention to provide novel ozonolysis products of tetrahydrophthalic acid derivatives.

A further object of this invention is to provide a new and useful method for the preparation of such ozonolysis products of tetrahydrophthalic acid derivatives.

A still further object is to provide a novel ozonolysis products of tetrahydrophthalic acid derivatives which serve as intermediates in the preparation of 1,2,3,4-butane tetracarboxylic acid derivatives, dialdehydes and glycol derivatives.

It has been found that the heretofore described ozonolysis products of tetrahydrophthalic acid derivatives may be prepared by oxidizing a mixture of the tetrahydrophthalic acid derivative and an organic reactive hydroxy compound with ozone.

The aforementioned ozonolysis may be carried out in the absence of a solvent. However, when the ozonolysis reaction is conducted in the presence of a solvent, there is employed a solvent which is substantially inert to the ozone under the conditions of the reaction.

Representative inert solvents of this nature include methyl formate, ethyl formate, ethyl acetate, acetone, chloroform, methylene chloride, carbon tetrachloride, acetonitrile and the like.

In general, the ozonization is carried out with a mixture of oxygen and ozone containing from about 1 to about 10% ozone. Ozone is produced by a silent electric discharge in air or oxygen by methods well known in the art. A device in which ozone is generated is commonly known as an azonator.

The molar ratio of the organic reactive hydroxy compound to tetrahydrophthalic acid derivative can vary from as low as 1:1 to as high as 15:1. A molar ratio of the organic reactive hydroxy compound to said acid derivative in the range of from about 1.5:1 to about 3:1 is preferred.

The temperature required for the reaction can be varied from —50° C. to 25° C. However, a temperature range of —5 to 5° C. is preferable.

Suitable organic reactive hydroxy compounds for use in preparing the ozonolysis products of tetrahydrophthalic acid derivatives include monohydric saturated aliphatic alcohols such as methyl alcohol, ethyl alcohol, propyl alcohol, butyl alcohol, amyl alcohol, hexyl alcohol, heptyl alcohol and octyl alcohol; saturated aliphatic monocarboxylic acids such as formic acid, acetic acid, propionic acid, butyric acid, pentanoic acid, hexanoic acid, heptanoic acid and octanoic acid; and aromatic monocarboxylic acids, for example, benzoic acid and the like.

The tetrahydrophthalic acid derivatives which can be used in preparing the novel ozonolysis products of this invention are selected from the group consisting of those having the formulae:

and

where $X_1$, $X_2$ and Y have the same meaning as previously noted.

Illustrative of the tetrahydrophthalic acid derivatives suitable for use in the preparation of the novel ozonolysis products of this invention include tetrahydrophthalic acid, tetrahydrophthalic anhydride, di-alkyltetrahydrophthalates such as dimethyl tetrahydrophthalate, diethyl tetrahydrophthalate, dipropyl tetrahydrophthalate, dibutyl tetrahydrophthalate, dihexyl tetrahydrophthalate, dioctyl tetrahydrophthalate, dinonyl tetrahydrophthalate, didecyl tetrahydrophthalate; dicycloalkyl tetrahydrophthalates such as dicyclopentyl tetrahydrophthalate, dicyclohexyl tetrahydrophthalate, etc.; diaryl tetrahydrophthalates such as diphenyl tetrahydrophthalate, etc.; diaralkyl tetrahydrophthalates such as dibenzyl tetrahydrophthalate, ditolyl tetrahydrophthalate and the like; N,N'-dialkyl tetrahydrophthalamides such as dimethyl tetrahydrophthalamide diethyl tetrahydrophthalamide, dipropyl tetrahydrophthalamide, dibutyl tetrahydrophthalamide, dihexyl tetrahydrophthalamide, dioctyl tetrahydrophthalamide, dinonyl tetrahydrophthalamide, didecyl tetrahydrophthalamide; N,N'-dicycloalkyl tetrahydrophthalamides such as dicyclopentyl tetrahydrophthalamide, dicyclohexyl tetrahydrophthalamide; N,N' - diaryl tetrahydrophthalamides such as diphenyl tetrahydrophthalamide, etc.; N,N'-diaralkyl tetrahydrophthalamides such as dibenzyl tetrahydrophthalamide, ditolyl tetrahydrophthalamide and the like; N-alkyl tetrahydrophthalimides such as methyl tetrahydrophthalimide, ethyl tetrahydrophthalimide, propyl tetrahydrophthalimide, butyl tetrahydrophthalimide, hexyl tetrahydrophthalimide, octyl tetrahydrophthalimide, nonyl tetrahydrophthalimide, decyl tetrahydrophthalimide; N-cycloalkyl tetrahydrophthalimides such as cyclopentyl tetrahydrophthalimide, cyclohexyl tetrahydrophthalimide, etc.; N-aryl tetrahydrophthalimides such as phenyl tetrahydrophthalimide, etc.; N-aralkyl tetrahydrophthalimides such as benzyl tetrahydrophthalimide, tolyl tetrahydrophthalimide, and the like.

The invention will be more readily understood by reference to the following examples which describe the detailed preparation of representative compounds. There are, of course, many other forms of this invention which will become obvious to one skilled in the art once the invention has been fully disclosed, and it will accordingly be recognized that these examples are given for the purpose of illustration only, and are not to be construed as limiting the scope of this invention in any way.

*Example 1*

A suitable reactor is charged with 15.0 grams (0.1 mole) of tetrahydrophthalic anhydride, 11.9 grams (0.4 mole) of methanol and 80 mls. of acetone and cooled to —25° C. An ozone stream is admitted to the solution until one equivalent of ozone has been absorbed. The clear colorless solution is allowed to warm to room temperature and the solvent is removed at reduced pressure. There is obtained a yield of 24.0 grams of the anhydride-ozonolysis reaction product having a neutral equivalent of 113.

*Example 2*

A suitable reactor is charged with 15.2 grams (0.1 mole) of tetrahydrophthalic anhydride and 73.2 grams (1.6 moles) of formic acid. An ozone stream is admitted to the agitated solution at 25° C. When the ozonization is complete the solvent is removed to yield 24.0 grams of a viscous ozonolysis reaction product.

*Example 3*

Following the procedure of Example 2, 100 grams (1.35 moles) of propionic acid is substituted for the formic acid to obtain an ozonolysis reaction product.

*Example 4*

Following the procedure of Example 2, 63 grams (1.05 moles) of acetic acid is substituted for the formic acid.

*Example 5*

A suitable reactor is charged with 20.0 grams (0.1 mole) of dimethyl tetrahydrophthalate and 47.6 grams (1.5 moles) of methanol and cooled to 0° C. A stream of ozone is admitted to the mixture until ozone absorption is complete. A reaction product of 28.0 grams is obtained as a colorless viscous oil upon removal of the excess methanol.

*Example 6*

A suitable reactor is charged with 19.0 grams (0.1 mole) of dimethyl tetrahydrophthalate, 12.5 grams (0.1 mole) of benzoic acid and 60 mls. of acetone and cooled to 0–10° C. A 6% ozone stream is admitted to the agitated solution for three hours. The temperature of the reaction mixture is increased to about 25° C. and the acetone is removed by distillation at reduced pressure. The yield of residue, 36.0 grams, is essentially quantitative for the corresponding ester-ozonolysis reaction product.

*Example 7*

Following the procedure of Example 5, 33.4 grams (0.1 mole) of dicyclohexyl tetrahydrophthalate is substituted for the dimethyl tetrahydrophthalate to obtain an essentially quantitative yield of the corresponding ester-ozonolysis reaction product.

*Example 8*

Following the procedure of Example 5, 32.2 grams (0.1 mole) of diphenyl tetrahydrophthalate is substituted for the dimethyl tetrahydrophthalate to prepare the corresponding ester-ozonolysis reaction product in excellent yield.

*Example 9*

Following the procedure of Example 5, 17.5 grams (0.05 mole) of dibenzyl tetrahydrophthalate is substituted for dimethyl tetrahydrophthalate to prepare the corresponding ester-ozonolysis reaction product in good yield.

*Example 10*

A suitable reactor is charged with 5.3 grams (0.03 mole) of tetrahydrophthalic acid and 73.2 grams (1.6 moles) of formic acid and cooled to about 10° C. A 3% ozone stream is admitted to the reaction mixture until oxidation is complete. A quantitative yield of carboxylic acid-ozonolysis reaction product is obtained.

*Example 11*

A suitable reactor is charged with 20.7 grams (0.1 mole) of N-butyl tetrahydrophthalimide and 79.0 grams (2.5 moles) of methanol and cooled to —5° C. A 6% stream of ozone is admitted to the agitated solution for two hours. Upon removal of the solvent, the N-butyl-imide-ozonolysis reaction product is recovered in high yield.

*Example 12*

Following the procedure of Example 11, 23.3 grams (0.1 mole) of N-cyclohexyl tetrahydrophthalimide is substituted for the N-butyl tetrahydrophthalimide to prepare the N-cyclohexylimide-ozonolysis reaction product in excellent yield.

*Example 13*

Following the procedure of Example 11, 22.7 grams (0.1 mole) of N-phenyl tetrahydrophthalimide and 105 grams (1.75 moles) of glacial acetic acid are utilized to prepare a good yield of phenylimide-ozonolysis reaction product.

*Example 14*

Following the procedure of Example 13, 24.1 grams (0.1 mole) of N-benzyltetrahydrophthalimide is substituted for the N-phenyl tetrahydrophthalimide to prepare the N-benzylimide-ozonolysis reaction product in good yield.

*Example 15*

A suitable reactor is charged with 11.2 grams (0.05 mole) of N,N'-diethyl tetrahydrophthalamide, 39.5 grams (1.25 moles) of methanol and 50 mls. of acetone and cooled to 5° C. A 3% ozone stream is admitted to the agitated solution until oxidation is complete. The temperature of the reaction mixture is increased to about 25° C. and the excess methanol and acetone are removed by distillation at reduced temperature. The residue is substantially diethylamide-ozonolysis reaction product.

*Example 16*

Following the procedure of Example 15, 16.6 grams (0.05 mole) of N,N'-dicyclohexyl tetrahydrophthalamide is substituted for the N,N'-diethyl tetrahydrophthalamide to prepare the corresponding dicyclohexyl-ozonolysis reaction product in good yield.

*Example 17*

A suitable reactor is charged with 6.3 grams (0.02 mole) of N,N'-diphenyl tetrahydrophthalamide, 30.5 grams (0.66 mole) of formic acid and 25 mls. of methylene chloride and cooled to 0.10° C. A 4% ozone stream is admitted to the agitated solution for two hours. A good yield of the phenylamide-ozonolysis reaction product is obtained upon removal of the methylene chloride and excess formic acid.

Example 18

Following the procedure of Example 17, 10.5 grams (0.03 mole) of N,N'-dibenzyl tetrahydrophthalamide and 23 grams (0.5 mole) of formic acid and 25 mls. of methylene chloride are utilized to prepare an excellent yield of dibenzylamide-ozonolysis reaction product.

The ozonolysis reaction products of the present invention can be readily converted to additional valuable products. The ozonolysis reaction products have been found readily oxidized to 1,2,3,4-butane tetracarboxylic acid derivatives. The oxonolysis reaction products may also be reduced to useful dialdehydes and further reduced to glycol derivatives which are useful in the preparation of resins.

A more detailed preparation of such 1,2,3,4-butane tetracarboxylic acid derivatives and dialdehydes from the ozonolysis reaction products of this invention is illustrated by the following examples.

Example 19

A suitable reactor is charged with 24.6 grams (0.1 mole) of the ozonization product of tetrahydrophthalic anhydride and formic acid, and heated to a temperature of about 50° C. 105 mls. (0.9 mole) of 30% hydrogen peroxide is then added at a rate to maintain a reaction temperature at about 65° C. to 75° C. The reaction mixture is then heated to reflux and an additional 20 mls. (0.2 mole) of 30% hydrogen peroxide is added. After all of the hydrogen peroxide is added, the reaction mixture is stirred at the reflux temperature for about one hour. The resultant colorless solution is concentrated to dryness at reduced pressure. A yield of 22.0 grams (95% of theory) of meso-1,2,3,4-butane tetracarboxylic acid, having a melting point of 188–190° C., is obtained.

Example 20

In a suitable reactor, a solution of 20.0 grams (0.1 mole) of dimethyl tetrahydrophthalate in 80 ml. of methanol is ozonized with a stream of 6% ozone at a temperature of about −50° C. 13.0 grams (0.1 mole) of trimethyl phosphite is added dropwise to the resultant reaction mixture at a rate to maintain the reaction temperature at about −50° C. After all of the trimethyl phosphite has been added the reaction mixture is allowed to warm to 5° C. and 0.5 ml. of water is added. The reaction mixture is allowed to remain at room temperature for about four days, after which the solvent and trimethyl phosphate is removed by distillation. There is obtained 26.0 grams of 3,4-dicarbomethoxy adipic aldehyde.

While this invention has been described with respect to certain embodiments, it is not so limited, and it should be understood that variations and modifications thereof may be made which are obvious to those skilled in the art without departing from the spirit or scope of this invention.

The embodiments of the invention in which an exclusive property or privilege is claimed are defined as follows:

1. A composition of matter selected from the group consisting of those having the formulae:

$$X_1-\underset{\underset{O}{\|}}{C}-CH \underset{X_2-\underset{\underset{O}{\|}}{C}-CH}{\overset{CH_2C\overset{H}{\diagup}\diagdown OOH}{\diagdown OZ}} \diagdown CH_2CHO$$

and $$\underset{\underset{O}{\|}}{C}-CH \underset{Y\diagdown \underset{\underset{O}{\|}}{C}-CH}{\overset{CH_2C\overset{H}{\diagup}\diagdown OOH}{\diagdown OZ}} \diagdown CH_2CHO$$

wherein:
$X_1$ and $X_2$ are each selected from the group consisting of hydroxy, NHR and OR;
Y is a member of the group consisting of oxygen and NR; and
R is a member of the group consisting of alkyl having 1 to 10 carbon atoms, cyclopentyl, cyclohexyl, phenyl, benzyl and tolyl;
Z is alkyl having from 1 to 8 carbon atoms, formyl, acetyl, propionyl, butyryl, pentanoyl, hexanoyl, heptanoyl, octanoyl and benzoyl.

2. A composition of matter of the formula $$X_1-\underset{\underset{O}{\|}}{C}-CH \underset{X_2-\underset{\underset{O}{\|}}{C}-CH}{\overset{CH_2C\overset{H}{\diagup}\diagdown OOH}{\diagdown OZ}} \diagdown CH_2CHO$$

wherein:
$X_1$ and $X_2$ are each selected from the group consisting of hydroxy, NHR and OR; and
R is a member of the group consisting of alkyl having 1 to 10 carbon atoms, cyclopentyl, cyclohexyl, phenyl, benzyl and tolyl;
Z is alkyl having from 1 to 8 carbon atoms, formyl, acetyl, propionyl, butyryl, pentanoyl, hexanoyl, heptanoyl, octanoyl and benzoyl.

3. A composition of matter of the formula $$\underset{\underset{O}{\|}}{C}-CH \underset{Y\diagdown \underset{\underset{O}{\|}}{C}-CH}{\overset{CH_2C\overset{H}{\diagup}\diagdown OOH}{\diagdown OZ}} \diagdown CH_2CHO$$

wherein:
Y is a member of the group consisting of oxygen and NR; and
R is a member of the group consisting of alkyl having 1 to 10 carbon atoms, cyclopentyl, cyclohexyl, phenyl, benzyl and tolyl;
Z is alkyl having from 1 to 8 carbon atoms, formyl, acetyl, propionyl, butyryl, pentanoyl, hexanoyl, heptanoyl, octanoyl and benzoyl.

4.

$$HO-\underset{\underset{O}{\|}}{C}-CH \underset{HO-\underset{\underset{O}{\|}}{C}-CH}{\overset{CH_2C\overset{H}{\diagup}\diagdown OOH}{\diagdown OCHO}} \diagdown CH_2CHO$$

5.

$$CH_3O-\underset{\underset{O}{\|}}{C}-CH \underset{CH_3O-\underset{\underset{O}{\|}}{C}-CH}{\overset{CH_2C\overset{H}{\diagup}\diagdown OOH}{\diagdown OCH_3}} \diagdown CH_2CHO$$

6.

$$C_2H_5HN-\underset{\underset{O}{\|}}{C}-CH \underset{C_2H_5HN-\underset{\underset{O}{\|}}{C}-CH}{\overset{CH_2C\overset{H}{\diagup}\diagdown OOH}{\diagdown OCH_3}} \diagdown CH_2CHO$$

7.
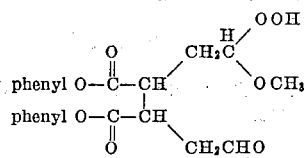
8.
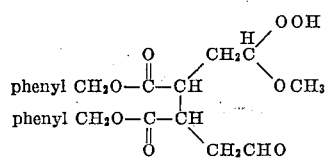
9.
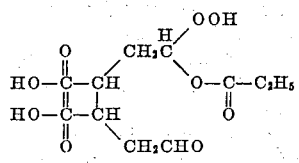
10.
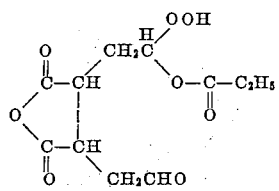
11.
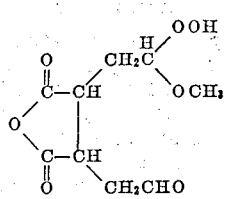
12.
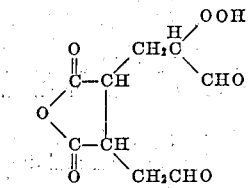
13.
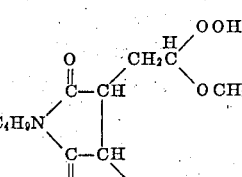
14.
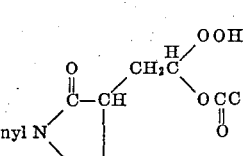
No references cited.
ALEX MAZEL, *Primary Examiner.*
HENRY R. JILES, JOSEPH A. NARCAVAGE,
*Assistant Examiners.*